Figure 1:
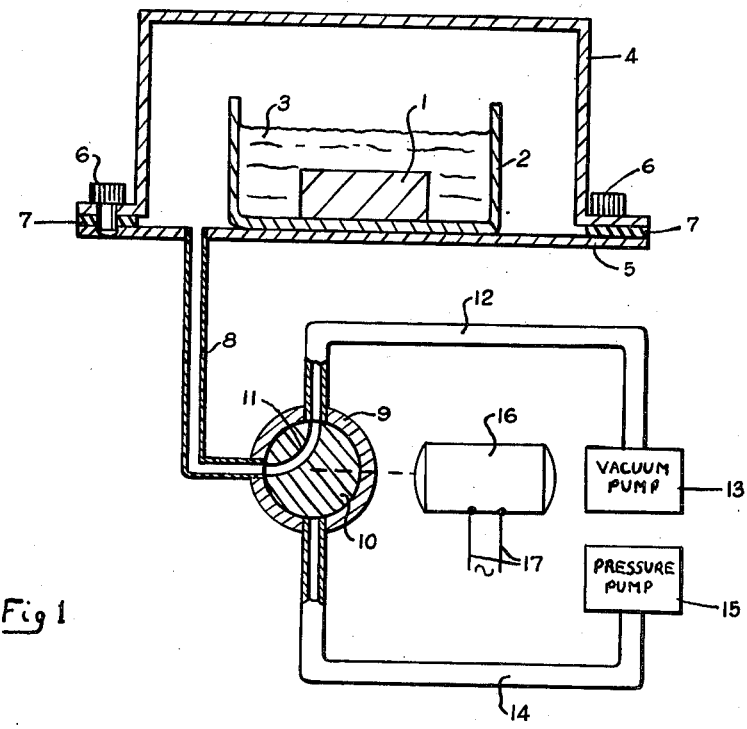

Dec. 8, 1964   J. PARISOT ETAL   3,160,519
NOZZLE MATERIAL FOR JET-PROPELLED ROCKETS
Filed July 28, 1960

United States Patent Office 3,160,519
Patented Dec. 8, 1964

3,160,519
NOZZLE MATERIAL FOR JET-PROPELLED ROCKETS
Jean Parisot, Argenteuil, and Pierre Leduc, Paris, France, assignors to Societe Le Carbone-Lorraine, Paris, France, a French body corporate
Filed July 28, 1960, Ser. No. 45,993
Claims priority, application France July 29, 1959
3 Claims. (Cl. 117—114)

The present invention relates to the production of materials for manufacturing nozzles for jet-propelled rockets and has for an object a material which is particularly suitable for this purpose.

It is a further object of the invention to provide a method of and apparatus for making such material.

Other objects and advantages of the invention will become apparent from a detailed study of the specification which is to follow.

Currents of gases, which are abrasive and corrosive and reach a very high temperature, pass through the nozzles of jet-propelled rockets. Therefore the material used for these nozzles must be highly resistant to corrosion and heat.

According to the invention there is provided a material for making nozzles for jet-propelled rockets which comprises a porous carbonaceous substance, the pores of which are obturated by bodies which vaporize in the course of the operation of the nozzle, emitting vapours forming a protective film between the carbonaceous substance and the corrosive gases present during such operation. Preferably the carbonaceous substance consists of graphite and the bodies obturating the pores must not react with the graphite in order that the laminary intermediary film formed by vaporisation protects the graphite from corrosion.

The obturating bodies must, owing to their latent heat of vaporisation, contribute to absorbing the heat given off. The laminary film formed thus has a double action: on the one hand it constitutes a protective layer against corrosion, and on the other hand it absorbs heat.

Advantageously the obturating bodies are impregnated into the pores of the graphite, and the impregnation agents, chosen may be metals or alloys which do not react with graphite, which are very fusible in order to be able to penetrate deeply into the pores of the graphite and also have a very high boiling point in order not to be too rapidly eliminated.

Among such fusible metals, tin is very suitable as it is very fusible, having a fusion point of 231° and boiling point of 2260° C.

The invention also provides a method of manufacturing material for use in making nozzles for jet-propelled rockets, which consists in immersing porous-carbonaceous material in a bath of a molten non-carbide-forming material capable of vapourising during the operation of the nozzle, and impregnating said molten material into the pores of said carbonaceous material by subjecting the materials alternately to vacuum and positive pressure.

Advantageously the impregnation is effected until the impregnant comprises at least 32.5% by weight of the resultant product.

Figure 2:
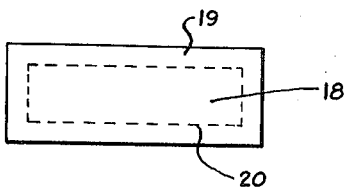

In order that the invention may be more clearly understood, reference will now be made to the accompanying drawings which show apparatus suitable for making the nozzle material according thereto, and a block of the material itself and in which:

FIGURE 1 shows a schematic arrangement of the apparatus, some of the parts thereof being in section, and FIGURE 2 shows a section through a block of the resultant material.

In the drawings at FIGURE 1, a block of graphite 1 is immersed in a bath 2 of molten tin 3. The bath is enclosed in a chamber 4 sealed to a base 5 by clamping means schematically shown by the screws 6, a compressible gasket 7 being located between chamber 4 and base 5.

Passing through base 5 is a conduit 8 communicating with a rotary valve casing 9 which houses a rotary valve 10 which is bored by an arcuate passageway 11. In the position shown, the passageway 11 connects the conduit 8 to a conduit 12 also connected to valve casing 9 and leading to a vacuum pump schematically illustrated at 13. When the rotary valve 10 is rotated for a quarter revolution in an anti-clockwise direction, the passageway 11 connects conduit 8 to a conduit 14 also connected to valve casing 9 and leading to a pressure pump 15.

Thus, continued rotation of valve 10 will alternately subject chamber 4 to a vacuum and a positive pressure. Preferably the valve 10 is driven by a power source such as an electric motor schematically illustrated at 16, the driving connection being illustrated by the dotted line. The motor is provided with current leads 17 to connect it to a suitable source of electrical energy, indicated as an A.C. source.

The apparatus is used to subject the chamber 4 to alternations of vacuum and positive pressure and the motor 16 is operated at a rate as found appropriate for this purpose.

The resultant block of material is schematically represented in the cross-section of FIGURE 2 in which 18 illustrates the base of carbonaceous substance, and 19 the impregnating material. The dotted internal line 20 indicates that there is no rigid line of demarcation between the base and the impregnant.

The process of manufacture will be better understood from the following specific example.

*Example.*—Graphite of quality 3780 is impregnated by immersion in the bath 2 of molten tin 3 and by an alternation of vacuum and pressure as referred to above in FIGURE 1. Alternations of vacuum and of 20 kg./cm.$^2$ pressure are exerted in order to obtain a rate of impregnation which is at least equal to 32.5% tin, this percentage being relative to the total weight of graphite and tin. It is advantageous to fill up all the accessible graphite pores and it is recommended to determine the porosity of the graphite in order to introduce a definite amount of tin in it.

If desired, other metals, and even more refractory metals may be used, provided that they do not react with the carbonaceous material and are capable of vaporisation during operation of the nozzle made from the impregnated material.

We claim:
1. A material for making nozzles for jet-propelled rockets, said material consisting of porous graphite, the pores of which are filled by tin.
2. A method of manufacturing material for use in mak- ing nozzles for jet-propelled rockets which consists in immersing graphite in a bath of molten tin, and impregnating said molten tin into the pores of said graphite by subjecting the materials alternately to vacuum and positive pressure within a closed vessel.

3. A method as claimed in claim 2, in which said impregnation is effected until the molten tin comprises at least 32.5% by weight of the resultant product.

References Cited in the file of this patent

UNITED STATES PATENTS

| | | |
|---|---|---|
| 1,093,614 | Gilson | Apr. 21, 1914 |
| 1,202,818 | Edgecomb | Oct. 31, 1916 |
| 1,547,539 | Antropoff | July 28, 1925 |
| 1,548,975 | Bleecker | Aug. 11, 1925 |
| 2,005,637 | Schidrowitz | June 18, 1935 |
| 2,120,816 | Schnoll | June 14, 1938 |
| 2,131,021 | Bemis | Sept. 27, 1938 |
| 2,615,932 | Marko et al. | Oct. 28, 1952 |
| 2,918,392 | Beller | Dec. 22, 1959 |
| 2,950,979 | Zosel et al. | Aug. 30, 1960 |

FOREIGN PATENTS

| | | |
|---|---|---|
| 2,169 | Great Britain | 1913 |
| 826,176 | Great Britain | Dec. 31, 1959 |